United States Patent
Walch et al.

(10) Patent No.: US 6,679,038 B2
(45) Date of Patent: Jan. 20, 2004

(54) HAYMAKING MACHINE, PARTICULARLY A MOWER WITH A WINDROW GROUPING DEVICE

(75) Inventors: Martin Walch, Dettwiller (FR); Joël Wilhelm, Saint-Louis (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 10/117,070

(22) Filed: Apr. 8, 2002

(65) Prior Publication Data

US 2002/0152735 A1 Oct. 24, 2002

(30) Foreign Application Priority Data

Apr. 18, 2001 (FR) .............................. 01 05266

(51) Int. Cl.[7] .......................... A01D 43/00; A01D 57/26; A01D 57/28; A01D 57/30
(52) U.S. Cl. ...................................... 56/192; 56/16.4 R
(58) Field of Search .................. 56/192, 14.5, 14.6, 56/16.4 R, 16.4 A, 228, 218, 189, DIG. 7, DIG. 21

(56) References Cited

U.S. PATENT DOCUMENTS

| | | |
|---|---|---|
| 2,666,518 A | 1/1954 | Page, Jr. |
| 3,214,002 A * | 10/1965 | Kirkpatrick et al. ..... 198/369.7 |
| 3,653,194 A * | 4/1972 | Lachman ................... 56/327.2 |
| 4,392,339 A | 7/1983 | Berlivet et al. |
| 5,031,393 A * | 7/1991 | Rostoucher ................. 56/154 |
| 5,351,468 A * | 10/1994 | Pominville ................... 56/192 |
| 5,507,136 A | 4/1996 | Walch |
| 5,749,390 A | 5/1998 | Ermacora et al. |
| 5,794,424 A | 8/1998 | Ermacora et al. |
| 5,901,533 A | 5/1999 | Ermacora et al. |
| 5,901,537 A | 5/1999 | Walch et al. |
| 5,930,988 A * | 8/1999 | Hanson .................... 56/16.4 A |
| 5,992,133 A | 11/1999 | Walch et al. |
| 6,003,291 A | 12/1999 | Ermacora et al. |
| 6,055,800 A | 5/2000 | Walch |
| 6,085,501 A | 7/2000 | Walch et al. |
| 6,101,796 A | 8/2000 | Wattron et al. |
| 6,145,289 A * | 11/2000 | Welsch et al. ................. 56/192 |
| 6,189,306 B1 | 2/2001 | Walch |
| 6,269,619 B1 | 8/2001 | Walch et al. |
| 6,308,504 B1 | 10/2001 | Walch et al. |
| 6,334,292 B1 | 1/2002 | Walch et al. |

FOREIGN PATENT DOCUMENTS

| | | |
|---|---|---|
| DE | 196 45 629 | 5/1998 |
| EP | 0 406 786 | 1/1991 |
| EP | 0 439 991 | 8/1991 |
| FR | 610 659 | 9/1926 |
| FR | 2 559 344 | 8/1985 |
| FR | 2 792 163 | 10/2000 |
| WO | WO 99/33332 | 7/1999 |

* cited by examiner

*Primary Examiner*—Árpád Fab Kovács
(74) *Attorney, Agent, or Firm*—Oblon, Spivak, McClelland, Maier & Neustadt, P.C.

(57) ABSTRACT

A haymaking machine, particularly a mower of plant matter with a grouping device allowing the plant matter cut in two passes to be grouped together into a double windrow or alternatively a single windrow to be formed. The grouping device is made of a first member for moving the plant matter toward the rear side of the machine and of a second member for moving the plant matter toward a side, the second moving member being mounted on a support in such a way that it can be moved closer to or away from the first moving member for forming a double windrow or a single windrow.

15 Claims, 5 Drawing Sheets

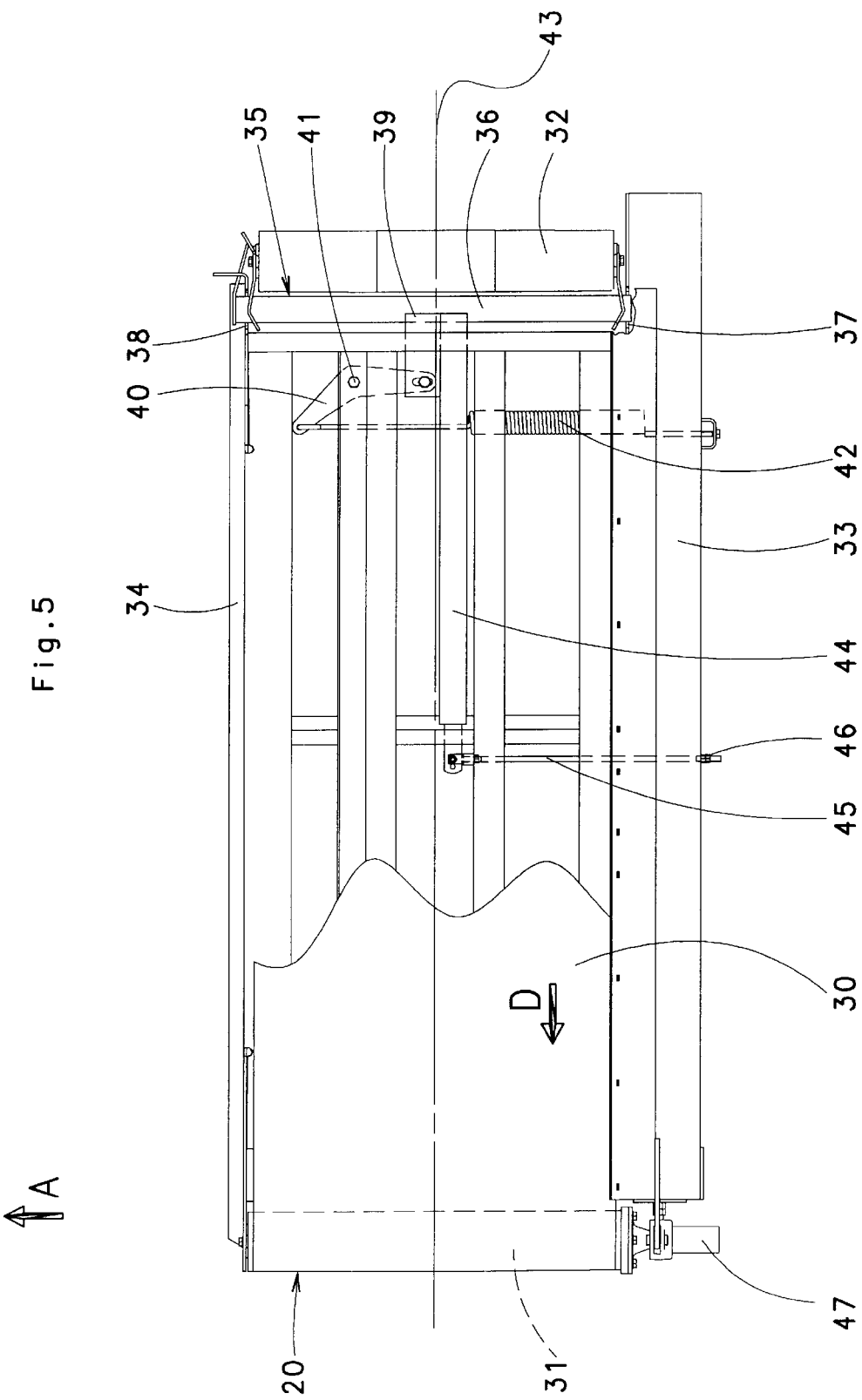

HAYMAKING MACHINE, PARTICULARLY A MOWER WITH A WINDROW GROUPING DEVICE

BACKGROUND OF THE INVENTION

1. Field of the Invention

The present invention relates to a haymaking machine, particularly a mower of plant matter which can be hitched to a tractor and comprises a frame bearing a cutting mechanism with which may be associated a conditioning mechanism and a grouping device allowing the plant matter cut in two passes to be grouped together into a double windrow or a single windrow to be formed, which grouping device is made up of a first member for moving the plant matter toward the rear side of the machine and a second member for moving the plant matter toward a side of the machine.

A grouping device of this kind makes it possible for the first moving member to be positioned very close to the cutting mechanism or to the conditioning mechanism. It thus receives all of the forage coming from these mechanisms. That avoids any loss of forage between the mechanisms and said moving member.

2. Discussion of the Background

In a known machine, the first and second moving members form an entity carried by arms which are articulated to the frame.

To form a single windrow, the two moving members are tilted backward and upward so that the forage drops directly onto the ground as it leaves the conditioning mechanism. In this position, the two moving members which extend quite a long way backward and upward are very bulky. They therefore impede the driver's rear view. They also give rise to premature wear of the entity and may even unbalance the machine when it is working on extremely uneven ground.

SUMMARY OF THE INVENTION

It is an object of the present invention to propose a machine as described in the introduction, with a grouping device that is simple and does not have the aforementioned drawbacks.

To this end, one important feature of the invention consists in the fact that the second moving member of the grouping device is mounted on a support so that it can be brought closer to or moved away from the first moving member for forming a double windrow or a single windrow. In this case, the first member remains in place and constantly moves the forage backward. To form a single windrow, the forage drops onto the ground between the two moving members. The movement of the second member alone is fairly simple. It is advantageously articulated to its support by means of a substantially horizontal axis. The latter advantageously lies to the rear of the second moving member. This arrangement makes it possible, simply by pivoting the second moving member about said axis of articulation, to obtain the space needed for the forage to pass toward the ground to form a single windrow. Said pivoting may be performed by means of a hydraulic ram.

According to another feature of the invention, folding deflectors are arranged under the second moving member. These deflectors are directed downward when the second moving member is moved away. They then guide the forage toward the ground and prevent it from becoming dispersed. Furthermore, these deflectors are folded upward into a substantially horizontal position when the second moving member is brought closer to the first moving member. This position may also be adopted for transport. These folded deflectors are thus away from the ground and do not carry the risk of remaining caught on any obstacles there might be.

According to another feature of the invention, the second moving member consists of a conveyor belt running over rollers. At least one of these rollers is mounted on a bearing piece which is connected to a pivot operated by a spring. The latter produces traction on said pivot so that it pushes the roller outward to constantly tension the conveyor belt in an optimum fashion.

According to another feature of the invention, one roller of the conveyor belt is driven in rotation by means of a hydraulic motor which is connected to a pump by means of pipes and which is controlled using a hydraulic directional-control valve. Actuation of the latter is advantageously combined with control of the hydraulic ram which causes the second moving member to pivot about its axis of articulation. The connection between the pump and the hydraulic motor is then automatically cut when said hydraulic ram causes the second moving member to pivot into the position in which it is away from the first moving member. Conversely, said connection is automatically reestablished when the hydraulic ram causes the second moving member to pivot into the position in which it is close to the first moving member.

BRIEF DESCRIPTION OF THE DRAWINGS

Other features and advantages of the invention will become apparent from the description hereinbelow of one nonlimiting exemplary embodiment of the invention, with reference to the appended drawings in which:

FIG. 5 depicts a detail view in part section of the second moving member.

DESCRIPTION OF THE PREFERRED EMBODIMENTS

Figure 1:
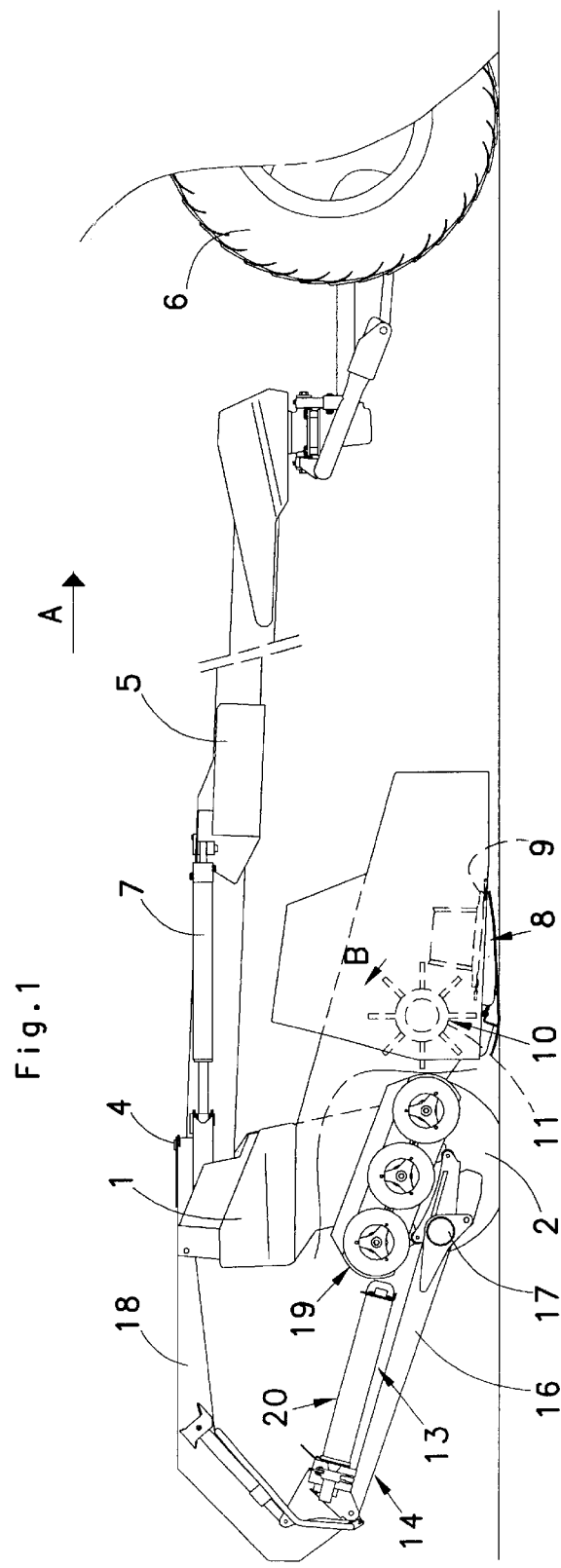
FIG. 1 depicts a side view, in part section, of a machine according to the invention.
Figure 2:
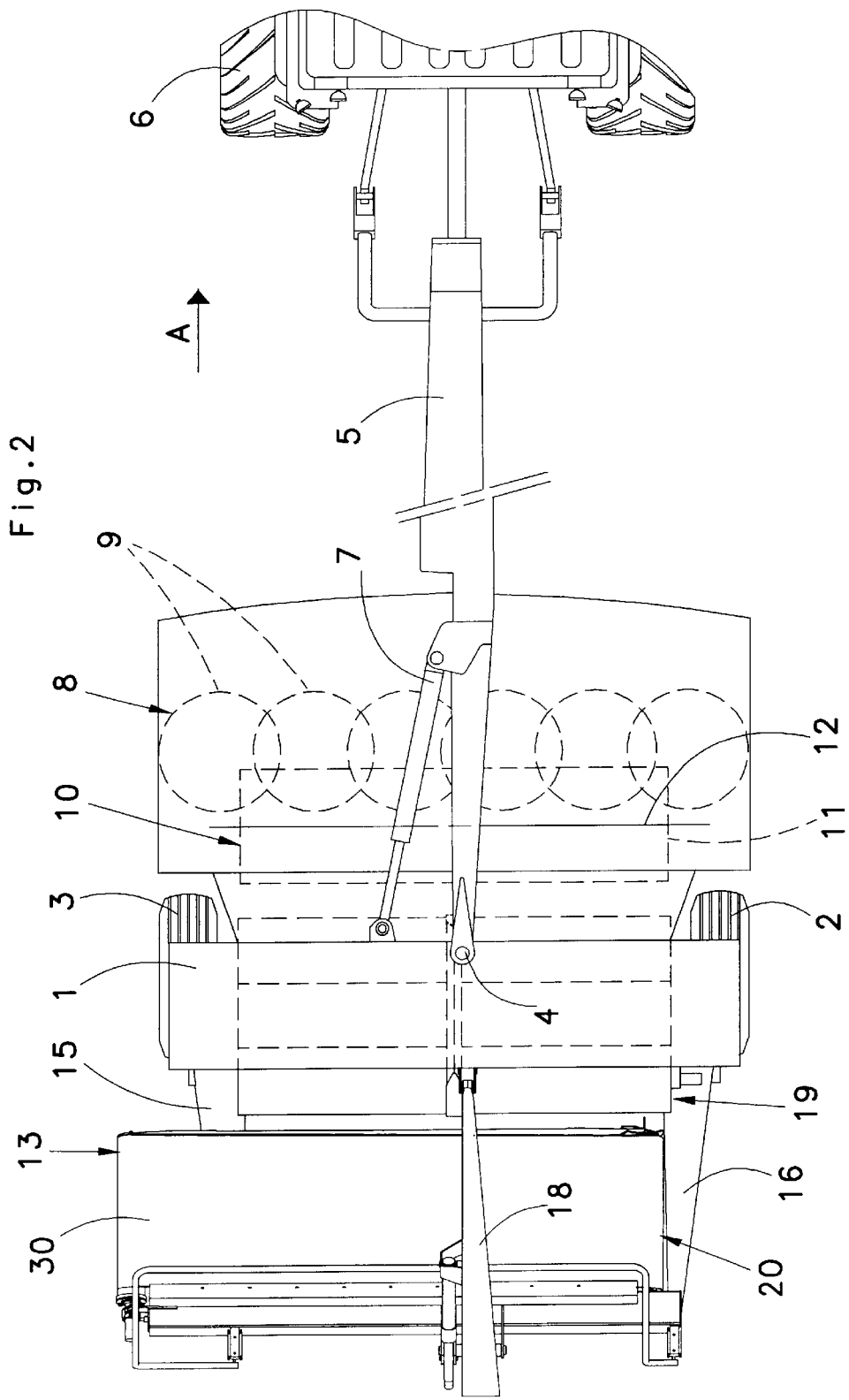
FIG. 2 depicts a top view of the machine according to the invention.

As depicted in FIGS. 1 and 2, the mower according to the invention comprises a frame 1 in the shape of an inverted U and equipped with two carrying wheels 2 and 3. Articulated to this frame 1, by means of a substantially vertical axis 4, is a drawbar 5 allowing hitching to a tractor 6. The latter is used to drive the mower and to move it along in the direction of forward travel indicated by the arrow A. The position of the frame 1 with respect to the drawbar 5 can be modified using a hydraulic ram 7. The latter allows the angle that the frame 1 makes with the drawbar 5 to be altered so as to move it into at least one transport position in which it lies in the continuation of the tractor 6 (FIG. 2), and at least one work position in which it is offset sideways with respect to the tractor 6.

Said frame 1 comprises a cutting mechanism 8 able to follow the unevenness of the ground. This mechanism 8 has a number of cutting tools such as disks 9 which comprise knives and are arranged in a line substantially perpendicular to the direction of forward travel A. For cutting, said disks 9 are driven in rotation about upwardly directed axes, off a power take-off of the tractor. The drive means may consist of gear wheels housed in a box situated under the disks 9, transfer gearboxes and not depicted transmission shafts. The frame 1 also carries a conditioning mechanism 10 which is associated with the cutting mechanism 8. Said conditioning mechanism 10 is produced in particular in the form of a rotor 11 intended to accelerate the drying of the cut plant matter. To this end, said rotor 11 is mounted so that it can rotate about a substantially horizontal axis 12 and comprises flails which break up the outer husk of the stems of the plant matter. Rotational drive of the rotor 11 may also be afforded off the power take-off of the tractor.

The frame 1 of the machine also carries a grouping device 13 allowing the plant matter cut in two successive passes to be grouped together into a double windrow or a single windrow to be formed. As is apparent from FIGS. 3 and 4, this grouping device 13 is mounted on a support 14 which consists of two lateral arms 15 and 16 connected by a crosspiece 17 and which lie under said device 13 and of a central arm 18 which extends over said device 13. The crosspiece 17 with the two lateral arms 15 and 16 is fixed to the lower part of the frame 1 while the central arm 18 is fixed to its upper part (see FIG. 1). The grouping device 13 is made up of a first member 19 for moving the plant matter toward the rear side of the machine and of a second member 20 for moving the plant matter toward a side of the machine. The first moving member 19 lies near the conditioning mechanism 10. It is formed, for example, of three horizontal drums 21 placed side by side and supported by the crosspiece 17. The drums 21 may be driven in rotation by hydraulic motors so as to move the plant matter backward over their topsides toward the second moving member 20.

The second moving member 20 is mounted on the support 14 in such a way as to be able to be moved closer to or away from the first moving member 19 for forming a double windrow or a single windrow. For this purpose, it is advantageously articulated to the support 14 by means of axes 22, 23, 24 which are substantially horizontal and aligned with one another. These axes lie near the rear side of the second moving member 20. The latter can be pivoted about the said axes 22 to 24 with a view to obtaining the aforementioned moving closer or further apart. A hydraulic ram 25 is articulated, on the one hand, to the second moving member 20 and, on the other hand, to the central arm 18 of the support 14. This ram 25, when actuated to lengthen or shorten it, brings about the abovementioned pivoting movements of the second moving member 20 about the axes 22, 23, 24.

Two folding deflectors 26 and 27 are arranged under the second moving member 20. Each of these deflectors 26 and 27 is formed of a sheet of approximately rectangular shape. Each is articulated to the structure of the second moving member 20 and is additionally connected to one of the arms 15 and 16 of the support 14 of the moving members 19 and 20 by means of rods 28 and 29. These rods are articulated to said arms 15 and 16 and to said deflectors 26 and 27. Each rod 28, 29 moves the corresponding deflector 26, 27 into a position in which it is directed obliquely downward, when the second moving member 20 is moved away from the first moving member 19. Conversely, it moves it into a substantially horizontal position, causing it to pivot upward about its axis of articulation to the structure of the second moving member 20, when the latter is moved closer to the first moving member 19.

The second moving member 20 consists of a conveyor belt 30 passing over rollers 31 and 32 which are directed in the direction of forward travel A and which are guided on stringers 33 and 34. It is apparent in particular from FIG. 5 that the roller 32 is mounted on a bearing piece 35 comprising in particular a crosspiece 36. The ends of this crosspiece 36 are guided in horizontally elongated holes 37 and 38 in the stringers 33 and 34 so that they can be moved in order to tension the conveyor belt 30. Said crosspiece 36 comprises a first arm 39 which is connected to one end of a pivot 40 which is articulated on a substantially vertical axis 41. A draw-spring 42 is hooked to another end of this pivot 40 and actuates it so that it pushes the crosspiece 36 and the roller 32 outward and moves them away from the roller 31. The first arm 39 is slightly offset with respect to a plane of symmetry 43 of the conveyor belt 30, of the crosspiece 36 and of the roller 32. Thus, the thrust of the pivot 40 tends also to cause the crosspiece 36 and the roller 32 to pivot in the horizontal plane.

The crosspiece 36 comprises a second arm 44 which runs parallel to the first arm 39. A partially threaded rod 45 is articulated to the free end of the second arm 44. This rod extends at right angles to said arm 44 and protrudes laterally beyond the conveyor belt 30. It allows the second arm 44 to be pulled or pushed and this then orientates the crosspiece 36 and the roller 32 in the horizontal plane. This, on the one hand, makes it possible to counter the abovementioned pivoting of the crosspiece 36 and of the roller 32 in the horizontal plane, which pivoting is brought about by the spring 42 and the pivot 40 and, on the other hand, allows the roller 32 to be brought into a position in which the conveyor belt 30 is perfectly centered on said roller 32. The rod 45 can be immobilized in the appropriate position using nuts 46.

The conveyor belt 30 is driven by a hydraulic motor 47 which drives the roller 31 in rotation. This motor 47 is connected by pipes to a hydraulic pump which may be arranged on the tractor. The motor 47 can be switched on and off using a hydraulic directional-control valve which opens and closes the passage of oil between said pump and the motor 47. Operation of said directional-control valve may be performed manually, but it is also advantageously combined with the control of the hydraulic ram 25 which causes the second moving member 20 to pivot about its axes of articulation 22 to 24. This combination is such that the passage between the pump and the hydraulic motor 47 is automatically closed when said hydraulic ram 25 causes the second moving member 20 to pivot into the position in which it is away from the first moving member 19 and such that said passage is automatically opened when the hydraulic ram 25 causes this second moving member 20 to pivot into the position in which it is close to the first moving member 19. In this case, the driving of the conveyor belt 30 of the second moving member 20 and its stopping are obtained automatically with the change in position of the moving member 20 without the user having to intervene.

Control of the hydraulic ram 25 which causes the second moving member 20 to pivot about its axes of articulation 22 to 24 may advantageously be combined with control of the hydraulic ram 7 which causes the drawbar 5 to pivot about the axis 4 of articulation to the frame 1. This combination is such that when the hydraulic ram 7 is operated, using a directional-control valve, to make it move into a first work position in which the drawbar 5 makes a certain angle with the frame 1, the hydraulic ram 25 is automatically operated to make it move the second moving member 20 away from the first member 19. Conversely, when the hydraulic ram 7 is operated so that it moves into a second work position in which the drawbar 5 forms a different angle with the frame 1, the hydraulic ram 25 is automatically operated so that it moves the second moving member 20 closer to the first member 19. Said positions of the drawbar 5 with respect to the frame 1 may correspond to work positions to the right and to the left of the tractor 6, which allows work to and fro. The positioning of the second moving member 20 can thus be obtained without particular intervention on the part of the user when switching from one work position to the other.

During work, the machine is pulled along by the tractor 6 in the direction A. The frame 1 is offset to the side of the tractor 6 by means of the hydraulic ram 7 which causes the drawbar 5 to turn about the axis of articulation 4. As a result, the tractor 6 does not run over the plant matter that is to be cut. The cutting mechanism 8 is lowered and glides over the ground. The disks 9 are driven in rotation so that their knives cut the plant matter in the front parts of their paths. Said plant matter is then taken up by the rotor 11 of the conditioning mechanism 10 which rotates in the direction of the arrow B. This mechanism breaks up the outer husk of the stems of the plant matter to accelerate its drying. This plant matter then arrives at the first moving member 19 which moves it to the rear of the machine. For that, the drums 21 are driven in rotation in the direction of the arrow C and pass the plant matter from one to the next.

Figure 3:
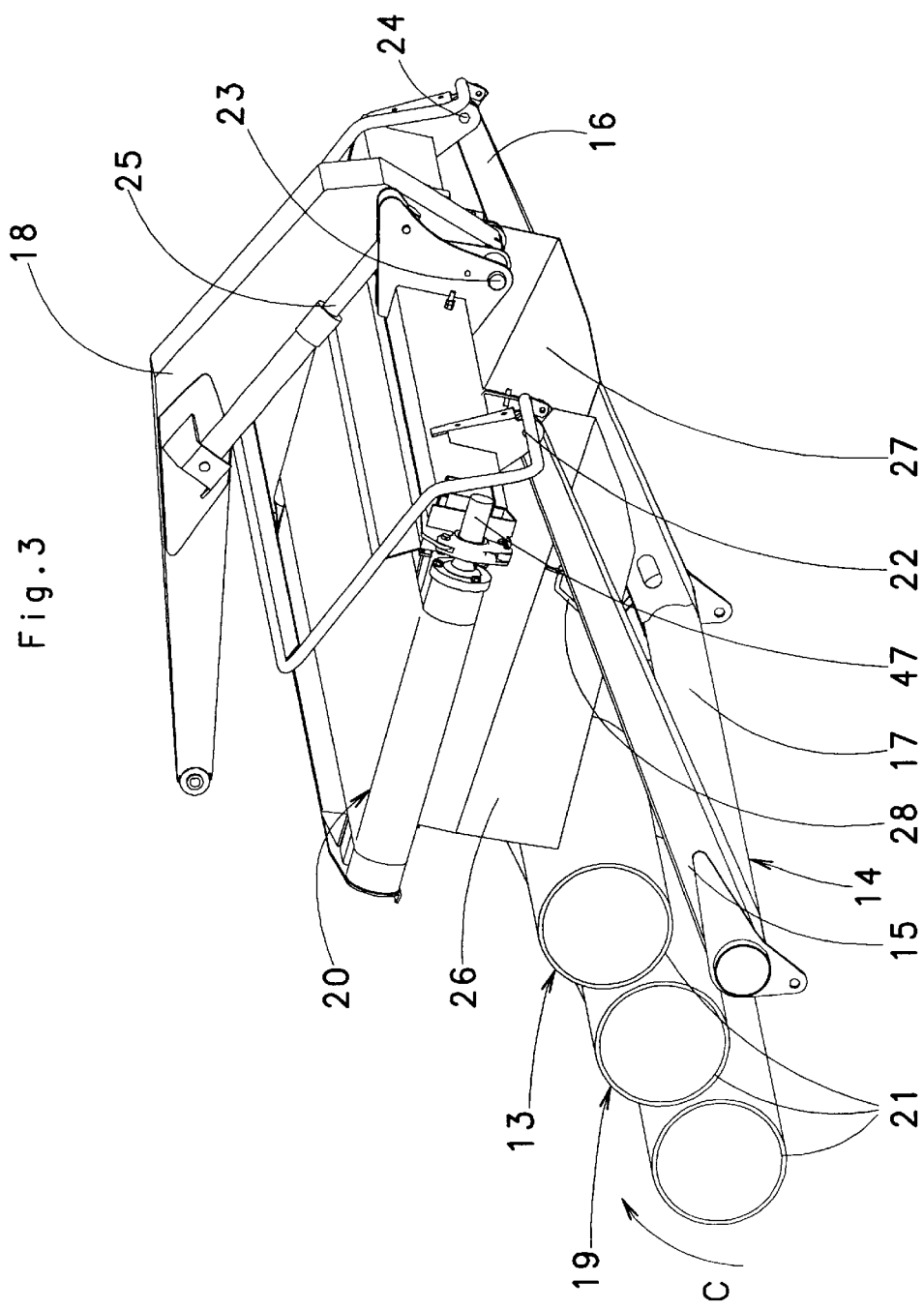
FIG. 3 depicts, on a larger scale, the windrow grouping device in a first work position.
Figure 4:
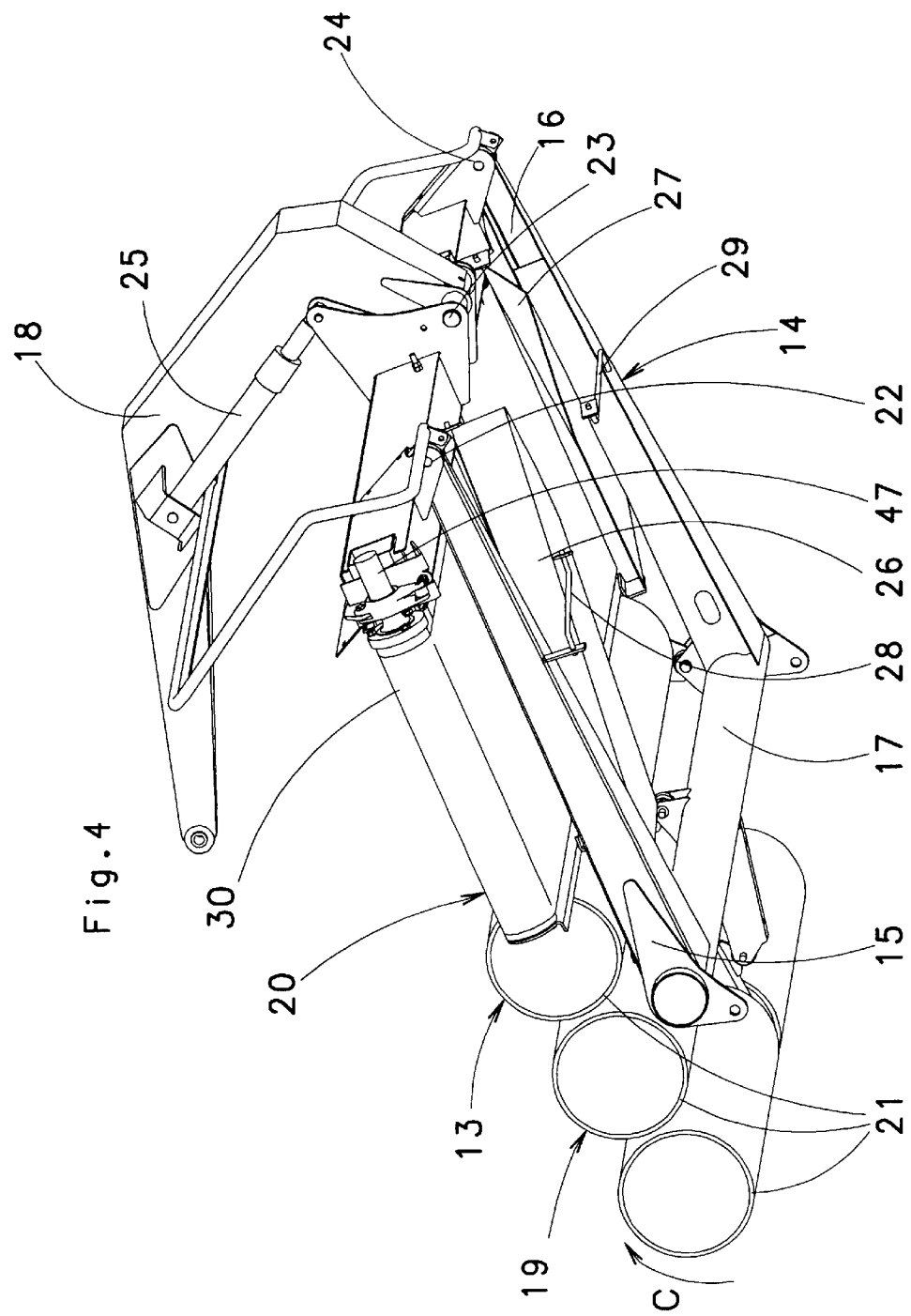
FIG. 4 depicts, on a larger scale, the windrow grouping device in a second work position.

During a first pass with the machine, the second moving member 20 is moved away from the first moving member 19 as depicted in FIG. 3. The plant matter then drops onto the ground behind said first member 19. It is guided by the deflectors 26 and 27 to form a window of relatively uniform width. During the next pass, the second moving member 20 can be moved closer to the first moving member 19 using the hydraulic ram 25 (FIG. 4). The roller 31 is then driven in rotation by the hydraulic motor 47 which can be operated at the same time as the aforementioned ram 25. The belt 30 therefore moves in the direction of the arrow D and moves the plant matter sideways so that it drops onto the windrow formed in the previous pass. This allows two windrows to be grouped together to make collecting the plant matter easier.

When the machine according to the invention is used to work in to and fro movements along the same side of a plot of land, the frame 1 is moved, at each about-turn, to the opposite side of the tractor 6 using the hydraulic ram 7. Operation of this hydraulic ram 7 may also automatically operate the hydraulic ram 25 so that in the outward pass, the second moving member 20 is moved away from the first member 19 and in the return pass said second member 20 is moved closer to the first. Thus, on the outward pass the plant matter drops directly onto the ground between the two members 19 and 20 and on the return pass it is moved sideways by the second moving member 20 to form a double windrow. The direction of travel of the belt 30 may be reversed if the user wishes to deposit the forage on the opposite side of the machine.

Obviously, the invention is not restricted to the embodiment described and depicted in the appended drawings. Modifications remain possible, particularly as regards the construction of the various elements or by substituting technical equivalents, without in any way departing from the scope of protection.

What is claimed as new and desired to be secured by Letters Patent of the United States is:

1. A haymaking machine comprising a frame bearing:
   a cutting mechanism;
   a conditioning mechanism associated with said cutting mechanism; and
   a grouping device allowing plant matter cut in two passes to be grouped together into a double window or a single windrow to be formed,
   said grouping device comprising:
      a first member for moving the plant matter toward a rear of the machines, and
      a second member for moving the plant matter toward a side of the machine,
      wherein the second moving member is mounted on a support so that it is movable to a position close to the first moving member for forming a double windrow and a position away from the first moving member for forming a single windrow.

2. Machine as claimed in claim 1, wherein the second moving member is articulated to the support by means of axes which are substantially horizontal and aligned with each other.

3. Machine as claimed in claim 2, wherein the axes of articulation lie to a rear of the second moving member.

4. Machine as claimed in claim 3, including a hydraulic ram for pivoting the second moving member about the axes of articulation by means of a hydraulic ram.

5. Machine as claimed in claim 1, wherein folding deflectors are arranged under the second moving member.

6. Machine as claimed in claim 5, wherein the deflectors are articulated to the second moving member and are connected to the support of the grouping device by means of rods.

7. Machine as claimed in claim 6, wherein the deflectors are directed obliquely downward by the rods when the second moving member is moved away from the first moving member.

8. Machine as claimed in claim 7, wherein the deflectors are folded into a substantially horizontal position by the rods when the second moving member is brought closer to the first moving member.

9. Machine as claimed in claim 1, wherein the second moving member consists of a conveyor belt running over rollers.

10. Machine as claimed in claim 9, wherein at least one roller is mounted on a crosspiece which is connected to a pivot operated by a spring.

11. Machine as claimed in claim 9, wherein one roller is driven in rotation by means of a hydraulic motor.

12. Machine as claimed in claim 11, wherein the second moving member is articulated to the support by means of axes and wherein actuation of said hydraulic motor is combined with operation of a hydraulic ram which causes the second moving member to pivot about its said axes of articulation.

13. Machine as claimed in claim 12, wherein the actuation of the hydraulic motor is automatically cut when said hydraulic ram causes the second moving member to pivot into the position in which it is away from the first moving member and wherein said actuation of the hydraulic motor is automatically reestablished when the hydraulic ram causes the second moving member to pivot into the position in which it is close to the first moving member.

14. Machine as claimed in claim 1, wherein the frame comprises a hitching drawbar which is articulated on a substantially vertical axis, a hydraulic ram for moving said drawbar about said axis, a hydraulic ram which causes the second moving member to pivot about axes of articulation to the support, said moving operation of the drawbar and said pivoting operation of the second moving member being combined.

15. Machine as claimed in claim 14, wherein, during the movement of the hydraulic ram situated between the drawbar and the frame into a first work position, the hydraulic ram which pivots the second moving member is operated so that it moves the latter away from the first moving member, and wherein during movement of said hydraulic ram situated between the drawbar and the frame into a second work position, said hydraulic ram which pivots the second moving member is operated in such a way that it moves the latter closer to the first moving member.

* * * * *